Oct. 9, 1962    A. P. ROBISHAW    3,057,315
FLOAT CONSTRUCTION
Filed Feb. 27, 1958    6 Sheets-Sheet 1
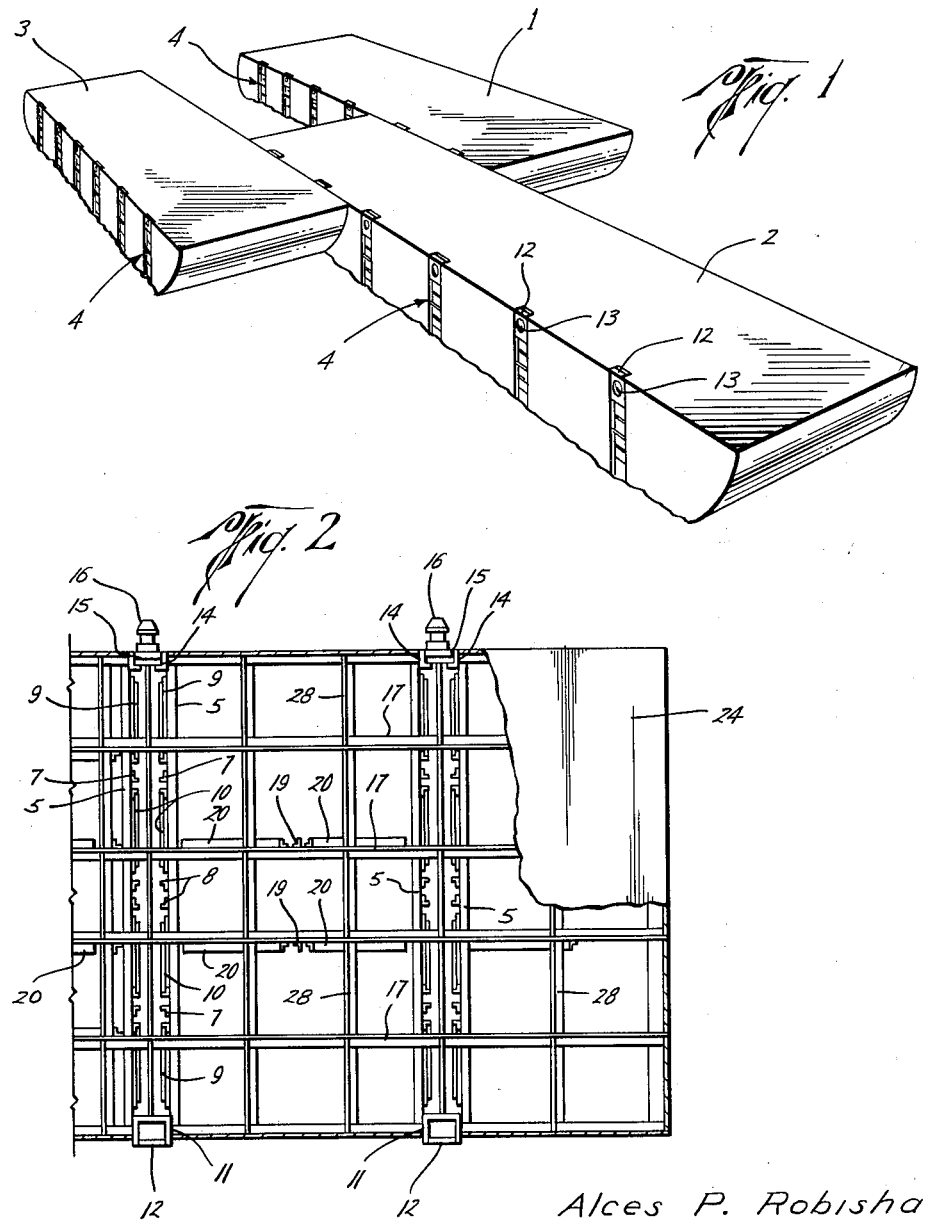
Alces P. Robishaw
INVENTOR.
BY
ATTORNEYS

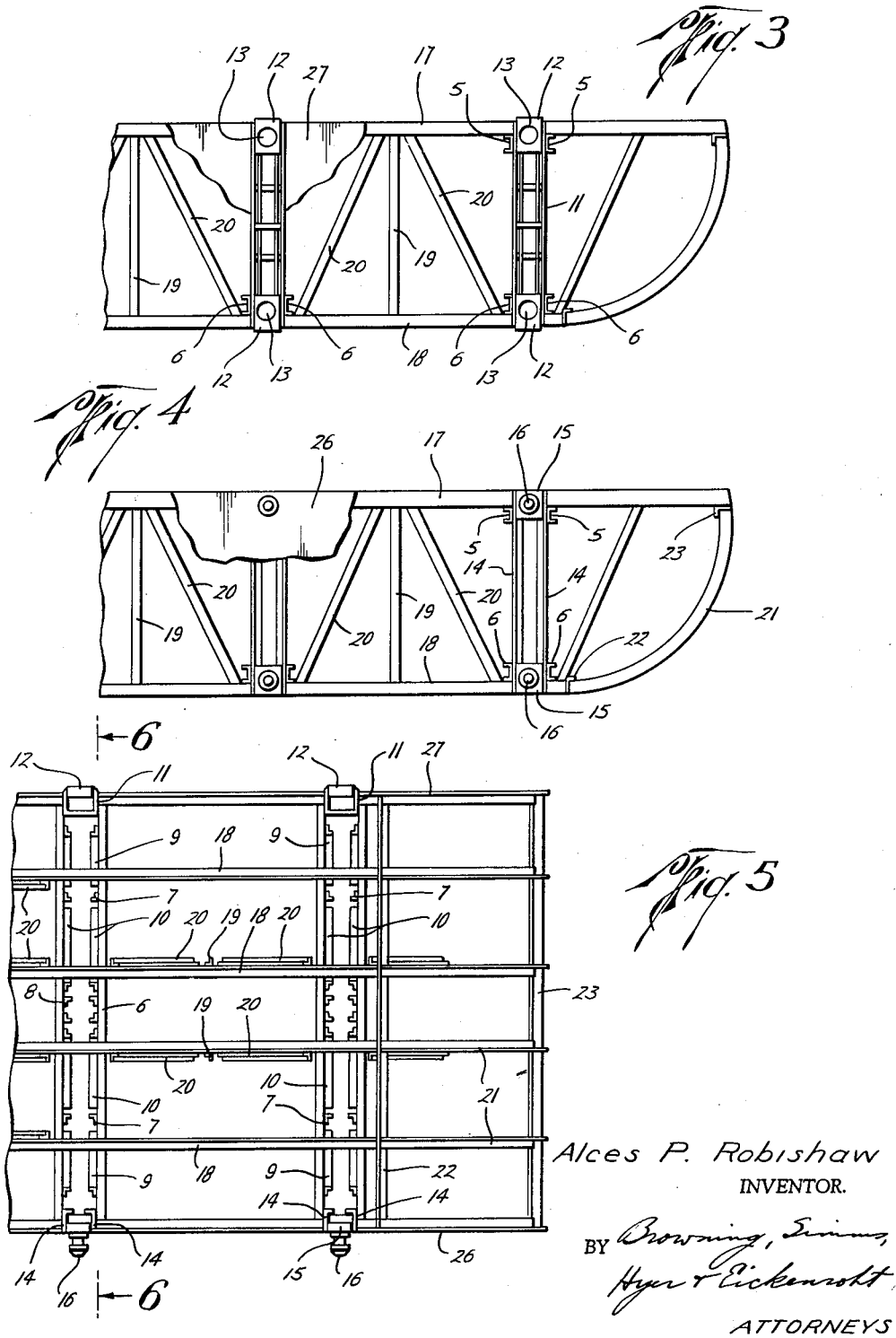

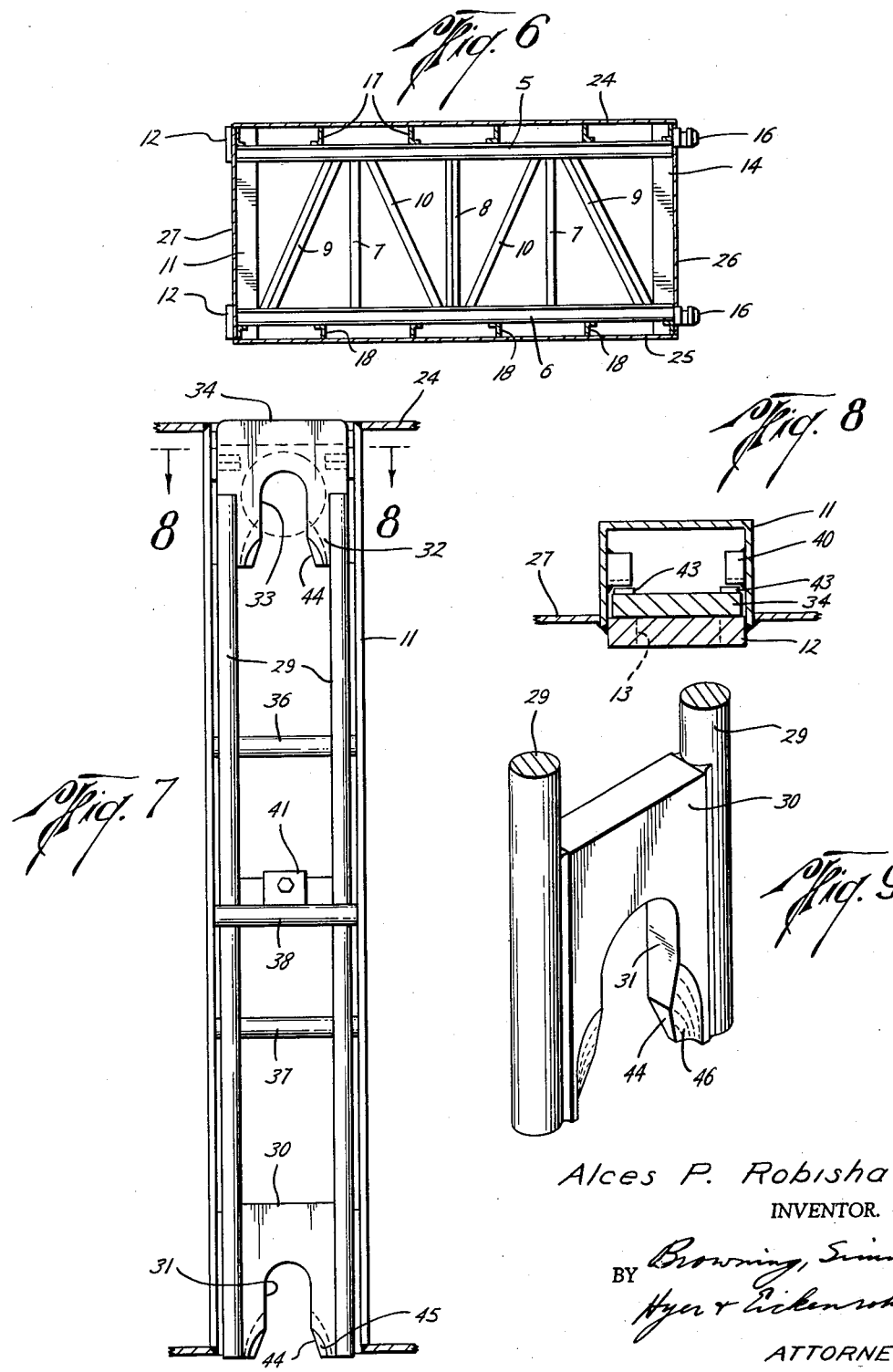

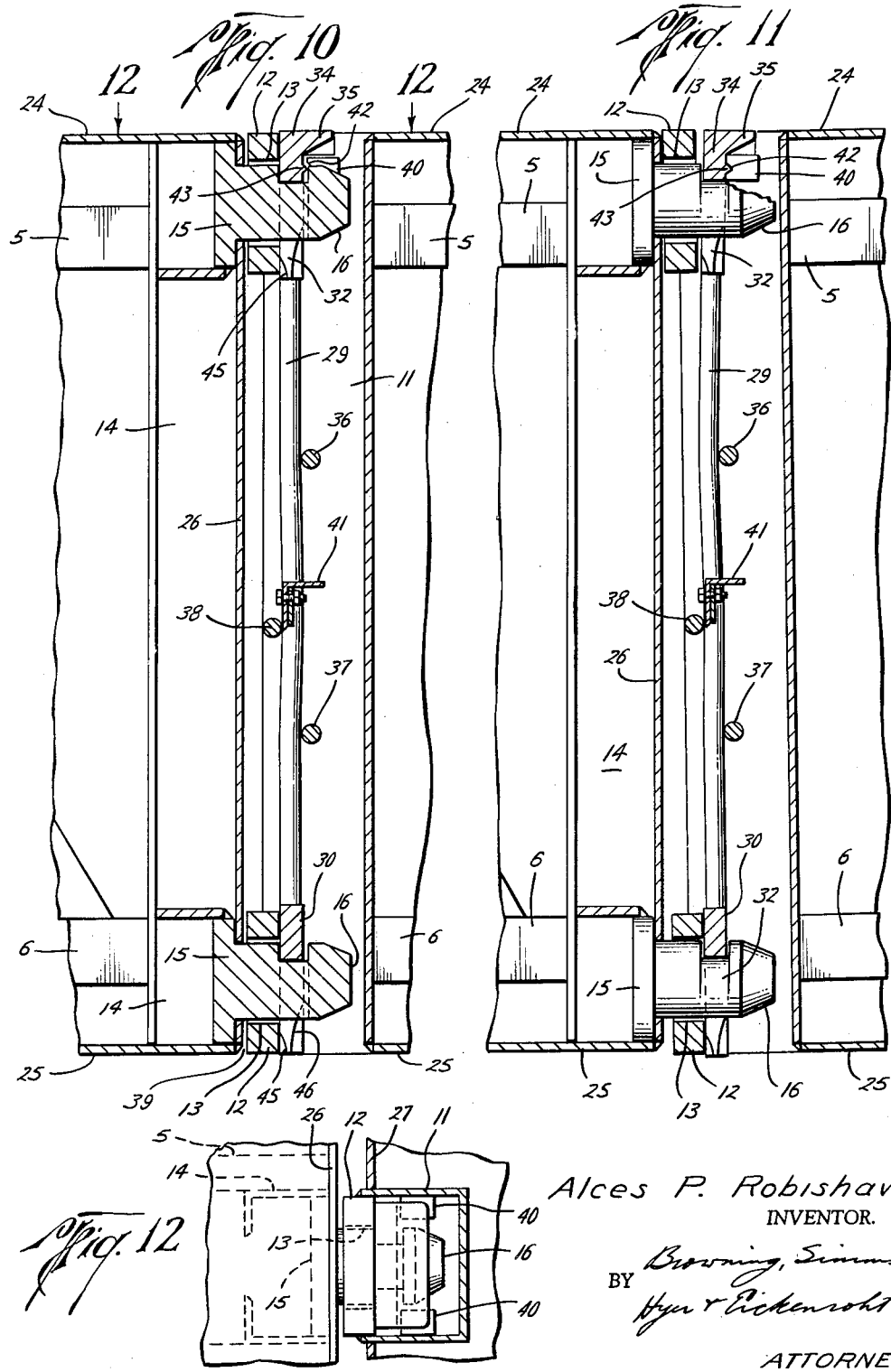

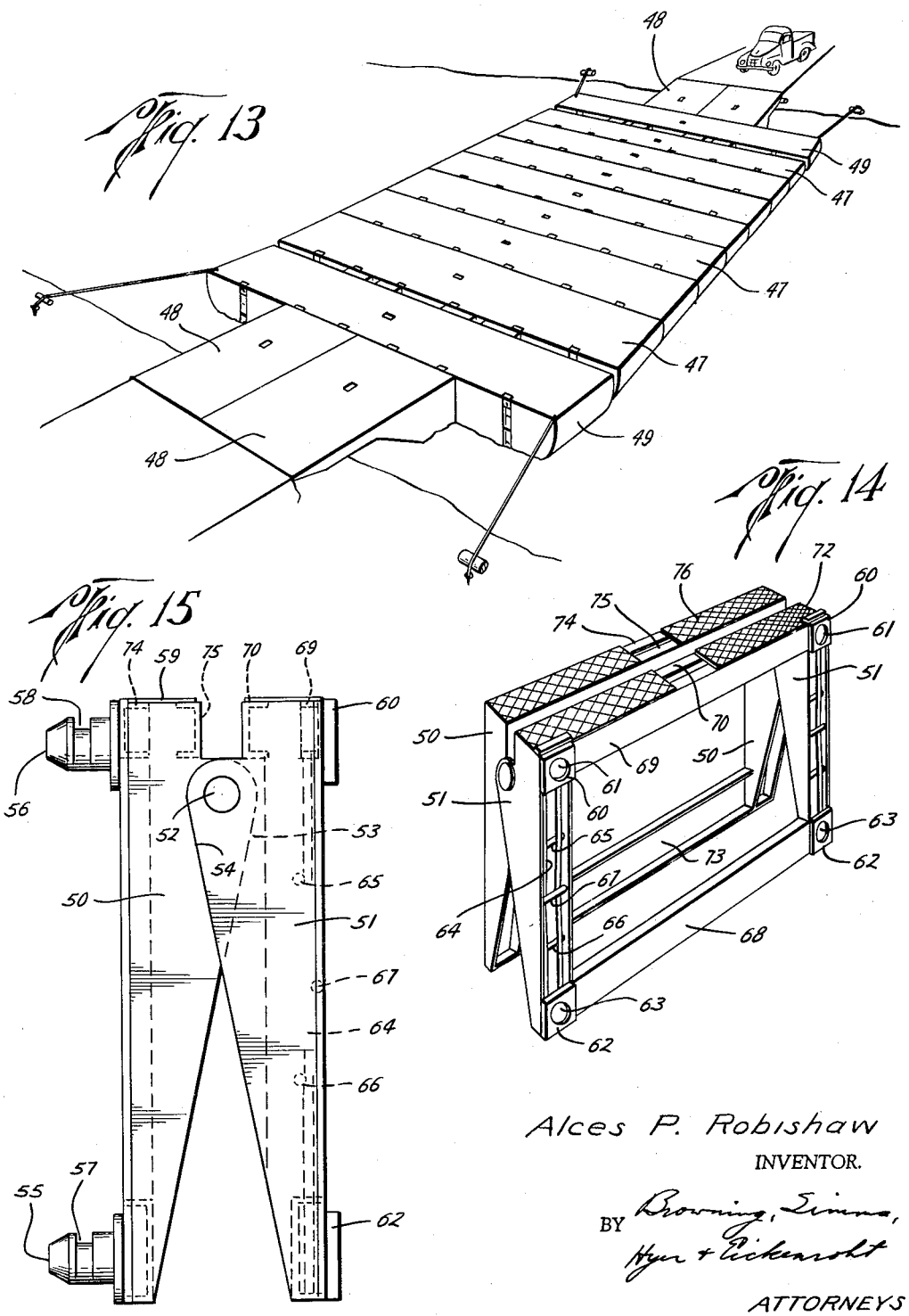

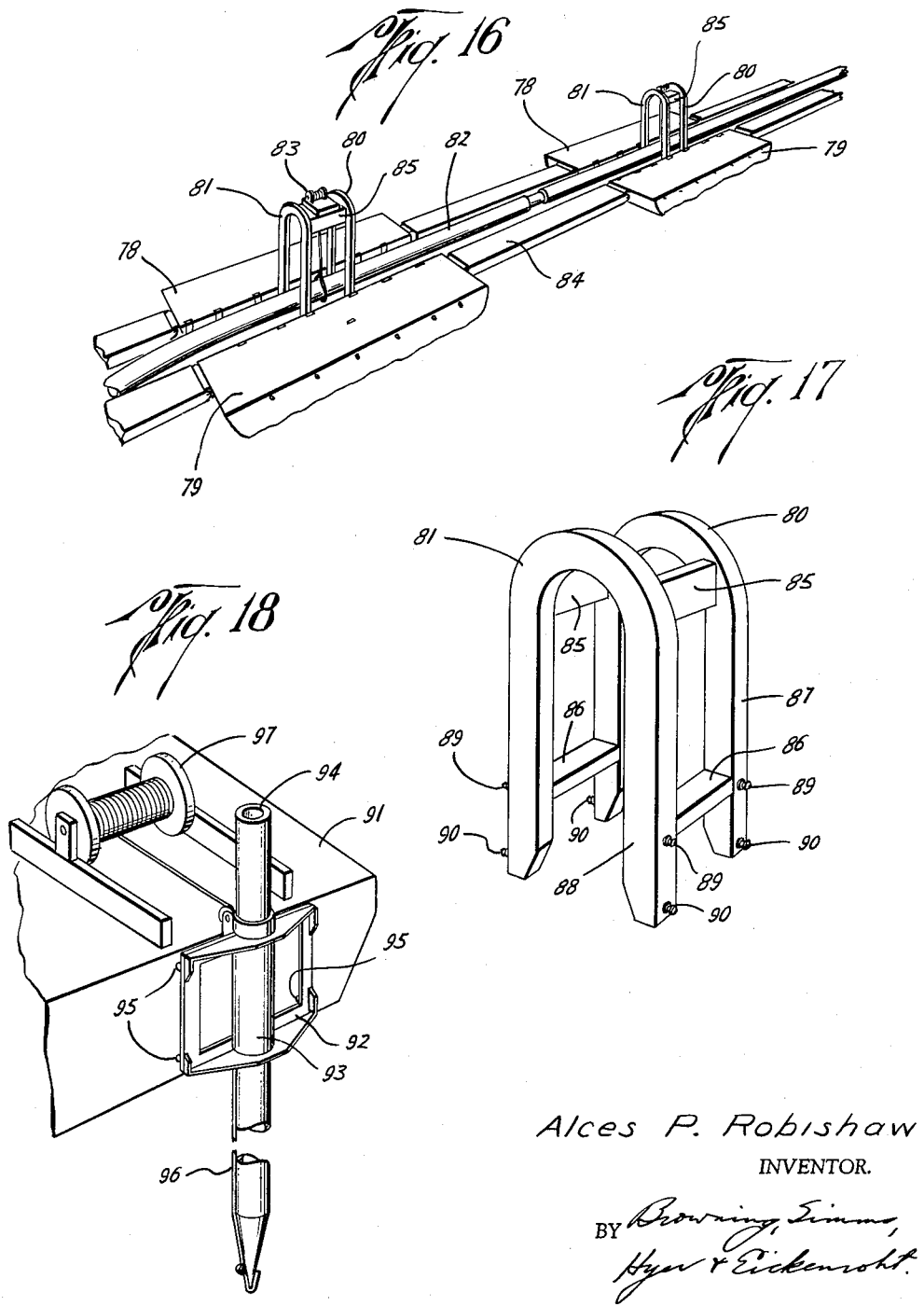

United States Patent Office 3,057,315
Patented Oct. 9, 1962

3,057,315
FLOAT CONSTRUCTION
Alces P. Robishaw, P.O. Box 19246, Houston 24, Tex.
Filed Feb. 27, 1958, Ser. No. 718,079
23 Claims. (Cl. 114—26)

This invention relates to floats adapted to serve as supports, means of transportation, work platforms and the like on water, to various combinations of such floats which may be used for the purposes for which barges, pontoon bridges, ferries, work platforms and the like are customarily used, to various means for securing such floats together to achieve various degrees of rigidity, flexibility, desired spacing and arrangement, and the like for various purposes. For the purposes of this application, single float elements will herein be referred to as floats and combinations thereof secured together as barges, even though in the latter instance the combination may be employed as a stationary floating platform or as a bridge, pier or the like.

The various features of this invention constitute improvements on and developments of the structure described and claimed in my copending application Serial No. 594,793, filed June 29, 1956 for "Barge," now Patent No. 2,876,726, issued March 10, 1959.

Heretofore floats and barges have been constructed with substantially rigid structural frameworks generally made up of trusses built in conventional fashion with upper and lower chords and struts interconnecting said chords at various points in such manner as to form the trusses into a series of triangular arrangements which are rigid within the limits of the strength of materials employed, particularly in the planes of such trusses, making the trusses themselves substantially inflexible when loaded in such planes.

It has been found that floats and barges constructed in the fashion just described are themselves substantially rigid, inflexible and unyielding when subjected to various loading forces and to the forces of wind and wave, being run aground in use, being transported overland, and the like, and that when subjected to forces somewhat exceeding the strength of the materials of which they are constructed, such floats and barges have taken on permanent distortions. Such permanent distortions render very difficult the matter of standardizing latch means for securing the floats together or for securing other members to the floats where such latching means on a single float are spaced from each other, for the reason that, once a float has been given a permanent set which is different from its original condition, standards of spacing and alignment of latching means mounting on it are destroyed and it may be found impossible to unlatch floats from each other if they have become distorted while latched together, or to latch them together if one or the other has become distorted previous to the latching attempt.

The float and barge construction shown and described in my prior copending application above mentioned, has proven highly successful in actual practice but in certain respects the expense of manufacture has been found to be rather higher and the universality of its application somewhat less than desirable. Under certain conditions of mishandling also the bars on which the locking members were carried have been bent in such fashion that the locking means have become less effective, and on occasions even the heads of some of the latching pins have been broken off or damaged. On occasion also it has been found somewhat difficult to obtain even the approximate degree of alignment required for engaging the locking members with the pins and in cases of slight misalignment the driving home of the locking members has been found rather difficult.

Furthermore, when the upper end of the locking bar has been driven to a position flush with the deck of the float on which it is mounted, it has been found difficult to engage and raise it; yet under actual usage there has at times been some tendency for the locking bar to work loose under the movements occasioned by wave action and the like.

Under certain circumstances it has been found that even the flexibility afforded by the latching mechanism of my copending application has not been as much as desirable. Furthermore, the disclosure of that application does not afford a means for joining together two or more floats in spaced apart relationship with a free waterway between them, nor does it disclose arranging the floats in various offset relationships for the purpose of obtaining maximum buoyancy where desired and openings between floats at points where such openings would be useful for the particular job at hand. Finally, the structure set forth in the aforesaid application does not provide various types of brackets for attachment to the floats, such as, for example, a so-called spud well which is a bracket having a sleeve vertically positioned so that a pole or spud may be lowered through the sleeve into engagement with the bottom for the purpose of providing a type of anchor for the float or barge.

It is, therefore, one object of this invention to provide a barge and float construction which will be sufficiently flexible so that under stresses of wave motion, uneven loading, transporting and other handling involved in actual use, the float or barge structure may yield to a very substantial degree from its normal shape without exceeding the elastic limit of the various parts of the structure, so that once a given load is removed from the float, it will assume its original shape and the locking mechanisms and other portions thereof will be fully operative even after long periods of extremely rough usage.

It is another object of this invention to provide such a float construction in which the flexibility and strength will be such that floats may be secured together in greatly offset relationship for the purpose of obtaining support where desired and openings between floats where desired, without the excessive stresses that accompany such operations resulting in permanent damage to the floats.

Another object of this invention is to provide a float structure which will have all of the strength and durability of previous float structures plus the flexibility above mentioned, and at the same time will require less structural material, weight, and cost of manufacture than previously employed structures.

Another object of this invention is to provide a latching or locking mechanism which may be driven down flush with the deck of a float on which it is mounted yet easily lifted when it is desired to unlock the mechanism.

Another object of this invention is to provide means whereby when a barge consisting of two or more floats has a load placed on its upper deck, the locks securing the floats together will be securely held in their locked position and in the event that due to wave motion and the like they are momentarily worked slightly away from their fully engaged position, they will immediately be returned to their fully engaged position thereby correcting such deviation.

Another object of this invention is to provide a locking mechanism in which the pins employed will be of greater strength than those heretofore provided and the breakage of the heads and pins substantially eliminated thereby.

Another object of this invention is to provide a locking mechanism which will engage the locking pins with a maximum area of contact even though the pins be not exactly aligned with the locking mechanism, and to shape the surface of engagement so that upon driving the locking mechanism home the pins will be automatically drawn into the desired alignment with the least possible effort and wear on the parts.

Another object of this invention is to provide a locking mechanism which will engage a pin to lock the same in place even though the pin be positioned off center in a lateral direction from the center line of the locking means.

Another object of this invention is to provide a locking bar in which the danger of bending the bar in rough handling and mishandling, to such a degree that the bar will not function in the intended manner, will be substantially eliminated.

Another object of this invention is to provide a barge having floats hingedly connected together and to provide a hinge mechanism cooperable with the normal means for securing the floats together for the purpose of hingedly connecting the floats in making a barge of such construction.

Another object of this invention is to provide a hinge of the character mentioned which will also afford tread surfaces substantially flush with the surfaces of the decks of the floats which the hinge connects, thereby bridging the space between floats due to the interposition of the hinge connection herebetween.

Another object of this invention is to provide a means for securing two or more floats together into a unitary structure while leaving a free waterway therebetween entirely from one end of the floats to the other.

Another object of this invention is to provide a means for securing two floats together in spaced relation with respect to each other so as to provide an unobstructed waterway therebetween from one end of the floats to the other, yet to connect said floats into a unitary barge structure, and also to provide means for supporting and hoisting or lowering loads into or from the open waterway between the floats.

Another object of this invention is to provide an attachment for a float which will utilize a means normally provided for securing the floats together in closely juxtaposed relationship.

Other objects and advantages of this invention will become apparent from the following description taken in connection with the accompanying drawings wherein are set forth by way of illustration and example one embodiment of a float and barge construction and locking mechanism therefor and various means utilizing said locking mechanism for securing the floats together in a desired relationship, all in accordance with this invention.

In the drawings:

FIG. 1 is a perspective view illustrating three floats secured together in offset relationship in such a fashion as to provide the maximum length of support and the maximum amount of open water in between two of the outside floats, thereby illustrating arrangements made possible by the float construction provided by this invention and a stress situation for which the float construction of this invention is highly suitable;

FIG. 2 is a top plan view of a portion of a float constructed in accordance with this invention, with the top sheet covering broken away to illustrate the interior construction of the float;

FIG. 3 is a similar fragmentary view of one side elevation of a float constructed in accordance with this invention with the covering sheet broken away likewise for the purpose of showing the interior construction of the float, the side illustrated in this figure being of the side carrying the sockets and locking mechanism for securing the floats together;

FIG. 4 is a side elevation of a portion of the opposite side of the float from that illustrated in FIG. 3, the outer covering being broken away in this view likewise for the purpose of illustrating the interior construction of the float;

FIG. 5 is a bottom plan view of the interior construction of the float with the sheet covering material removed therefrom, only a portion of the length of the float being illustrated;

FIG. 6 shows a transverse cross section along the line 6—6 of FIG. 5, illustrating the interior construction of the float and the manner in which it is covered as well as the mounting for the locking mechanisms employed in securing two or more floats together;

FIG. 7 is a fragmentary view of an enlarged scale illustrating the locking bar and locking member arrangements employed with the sockets of the locking mechanism, the same being illustrated in fully locked or engaged position;

FIG. 8 is a horizontal cross section taken along the line 8—8 of FIG. 7 and illustrating the means for preventing accidental working of the locking mechanism to an unlocking position and for constantly returning it to a fully locked position in the event that it deviates from such position;

FIG. 9 is a substantially enlarged fragmentary perspective view illustrating the locking means at the lower end of the locking bar illustrated in FIG. 7 and more particularly illustrating the flared portions of the open end of the slot forming part of this locking mechanism, by which the locking means is enabled to engage an off center or misaligned pin and easily draw it into full engagement in locked position;

FIG. 10 is a fragmentary view in vertical cross section through the side walls and locking mechanisms of two adjacent floats secured together by locking means constructed in accordance with this invention, the parts being here illustrated with no load on the floats;

FIG. 11 is a view similar to FIG. 10 but showing the position occupied by the various parts when the floats are loaded on their upper decks and illustrating the operation of the means for keeping the locking mechanisms in fully engaged position;

FIG. 12 is a fragmentary plan view taken along the line 12—12 of FIG. 10 and illustrating the upper end of the locking bar when fully driven into locking position;

FIG. 13 is a perspective illustration of a bridge constructed of floats made and secured together in accordance with this invention, particularly illustrating the utility of the hinge fitting of this invention in the provision of a barge serving as a pontoon bridge or the like;

FIG. 14 is a perspective view of a hinge constructed in accordance with this invention;

FIG. 15 is an end elevation of the hinge mechanism illustrated in FIG. 14, on a somewhat enlarged scale, for the purpose of illustrating the means for securing this hinge mechanism to the floats which it is adapted to interconnect;

FIG. 16 is a perspective view illustrating barges formed in accordance with this invention by joining together two or more floats in spaced relation to each other with an open waterway therebetween and illustrating the use of such barges and the means for joining the floats together in supporting a load between the floats;

FIG. 17 is a perspective view of the means for joining the floats together which is illustrated in FIG. 16, the same being on a much enlarged scale for the purpose of illustration; and FIG. 18 is a view illustrating in fragmentary perspective a spud well attachment for a float constructed in accordance with this invention.

Taken in its overall aspect this invention provides a float and barge construction which is physically flexible and lightweight and not susceptible of taking a permanent set due to distortion in rough usage and hence suitable for carrying the improved locking mechanism for joining floats together and making for great versatility in the arrangements that can be provided, together with modified connector means or locking mechanism for joining floats together with greater flexibility or with desired space between them and for handling loads between them, as well as for securing to floats external objects such as a spud well.

The flexible float construction forming part of this invention is provided by building the structural framework of the float of what are in effect intersecting longitudinal and transverse trusses, the trusses being so braced between their upper and lower chords that the struts interconnecting said chords are secured to the chords, respectively, at such positions as when they transmit a thrust or pull upon a chord the chord is loaded with a beam type of loading. This is because each strut is connected to each chord at a position spaced longitudinally of the chord from the position at which any other strut is connected to such chord. Thus, whenever a strut supplies a lateral load on a chord, the lateral support for the chord to withstand such loading is applied to the chord at points spaced from that at which the load is applied. Thus, the chord is loaded with a beam loading and advantage is taken of the flexible nature of the material of the chord to permit the truss as a whole to flex and yield under loads.

Furthermore, the longitudinal trusses have their top and bottom chords in engagement with the upper surfaces of the top chords of the transverse trusses and with the bottom surfaces of the lower chords of the transverse trusses, respectively, and are secured thereto. However, the points where these chords of the longitudinal trusses cross the chords of the transverse trusses and transmit loads thereto or therefrom are carefully arranged so as not to overlie or be in alignment with any of the struts interconnecting the upper and lower chords of the transverse trusses. Due to this, the loads placed on the upper and lower chords of the transverse trusses by the upper and lower chords of the longitudinal trusses will likewise be beam loadings. This permits much greater flexibility than is present in the customary triangular truss arrangement. Furthermore, additional sills are extended between the upper chords of the longitudinal trusses and secured thereto and these likewise are so positioned as not to in any instance directly overlie the connection of one of the struts interconnecting the upper and lower chords of the longitudinal trusses at any of the points where the same are connected to the upper chord. The upper chords of the longitudinal trusses themselves actually act as sills extending across the upper chords of the transverse trusses.

Thus, in every instance possible flexibility has been incorporated into the longitudinal and transverse trusses and into their connections with each other yet these trusses have been so braced that the amount of their flexing will be limited at any particular point. It has been found that the total effect of this arrangement is a float frame construction so flexible that it may yield and flex under loads to every degree necessary without exceeding the elastic limits of its parts or taking a permanent set and that upon coming to rest it will return to its initial form and shape so that coupling mechanisms mounted thereon will be again positioned in accordance with standard alignments and the coupling mechanisms of different floats which have been so strained will again fit together.

In FIG. 1 there is illustrated a barge constructed of three floats 1, 2 and 3, the floats 1 and 3 being offset longitudinally from the float 2 so as to overlap only a small portion of one end thereof but being in substantial register with each other. In such position, these floats are shown locked together by bringing into register two of the vertical groups of locking mechanism presently to be described adjacent one end of the float 1 and adjacent the other end of the float 2. The same is true of the arrangement between the float 2 and the float 3. Even though such an arrangement places great stresses upon the locking mechanisms which are engaged because of the elongated barge effect obtained by this arrangement, nevertheless due to the flexible float construction above mentioned and presently to be described more in detail, these stresses have been found to be readily handled.

It may be seen that the floats 1, 2 and 3 are all disposed so that the socket portions of their locking mechanisms for locking the floats together all appear on the side which shows in this view, these locking mechanisms being generally designated by the numeral 4. The mating portions of the locking mechanisms which comprise the pins presently to be described do not appear in these figures.

Reference is now had to FIGS. 2, 3, 4, 5 and 6. The structure of the transverse truss is best apparent in elevation in FIG. 6. It will be seen that this truss consists of an upper chord 5, a lower chord 6, upright struts 7 and 8 extending between these chords at substantially right angles thereto, and inclined struts 9 and 10 likewise extending between these chords at acute angles thereto. As will appear in FIGS. 3 and 4, the upper and lower chords 5 and 6, respectively, are provided by channel members, there being two channel members in each chord with their open sides facing endwise of the float away from each other. The channels 5 and 6 of the top and bottom chords are spaced apart at one end of the truss by the channels 11 which face outwardly through the sides of the float and provide a mounting space in which the socket blocks 12 having the sockets 13 therein are welded.

At their opposite ends, these chords are welded to the outside surfaces of the angles 14 between which the pin blocks 15 carrying the locking pins 16 are mounted and welded. Thus, it will be seen that the channel 11 and the angles 14 together with their interconnecting blocks 15 serve as the end members of the transverse trusses. This construction provides a rigid positioning and spacing between the pins 16 at one end of each transverse truss and the sockets 13 at the other end of each such truss, but otherwise the truss is so arranged at each point where a load is applied to either the top or bottom chord thereof, that it will load such chord with a beam loading and thereby take advantage of the natural flexibility and resiliency of the chord. Also, adjacent but spaced from each such point of loading by a strut, each beam or chord will be laterally supported by an adjacent strut.

The longitudinal trusses have top chords 17 and bottom chords 18 joined together by vertical struts 19 and inclined struct 20. In this instance likewise these struts join the respective chords 17 and 18 and are secured thereto at positions which are spaced somewhat from the nearest adjacent point of joinder of another strut with the chords.

The forward end of each lower chord 18 is connected by means of a curved beam 21 to the forward end of the upper chord 17 thereby providing a rake end for the float. This forward ends of the lower chords 18 may be tied together by a suitable connecting member such as the angle 22 and the forward ends of the upper chords 17 may likewise be tied together by a suitable member such as the angle 23.

It will be seen that the upper chords 17 extend across and rest upon the upper surfaces of the upper chords 5 of the transverse trusses, and since the upper chords 17 form a direct support for the sheet material 24 forming the deck of the float, loads placed on such deck will be transmitted by the upper chords 17 to the upper chords 5 so that the chords 17 serve as sills. By reference to FIG. 6 it will readily be seen that these upper chords 17 rest on the upper chords 5 at points spaced laterally from the points at which any of the struts 7, 8, 9 or 10 provide supports for chords 5. Thus, the chords 17 place a loading upon the chords 5 which is in the nature of a beam loading and takes advantage of the flexibility of the chords 5 in a lateral direction under the beam loading. The same is true of the hydraulic loading transmitted through the bottom sheet of covering material 25 to the bottom chords 18 of the longitudinal trusses and in turn transmitted by these bottom chords 18 to the bottom chords 6 of the transverse trusses. Here again, the engagement of the chords 18 against the chords 6 and the force applied thereto due to the pressure of water against the sheet 25 will place the chords 6 in beam loading and take advantage of their natural flexibility.

It will be understood that the sheet-like covering material, which in most instances will be a heavy gauge plate or sheet metal, extends also up the sides of the float as shown at 26 and 27, respectively.

It has been found in actual practice that a structural framework for a float constructed in the manner just described can be made of lighter material and of overall less weight and less expensive fabrication than one made in the conventional rigid truss construction. Furthermore, a float framework constructed as just described has far greater flexibility with much less tendency on any part of the framework to be stretched beyond its elastic limit and take a permanent set. Hence, when stressed in actual operation a float constructed in accordance with this invention will flex substantially greater amount than a float or ordinary construction, but will then return to its normal shape rather than taking a permanent set, with the result that the standard spacing and positioning of the coupling parts 13 and 16 will remain as originally designed and floats constructed in this fashion may be repeatedly connected together and disassembled at intervals during their lifetime.

It will be understood that whenever found desirable additional cross members 28 may be provided parallel to the transverse trusses and interconnecting the top chords of the longitudinal trusses as clearly illustrated in FIG. 2. These distribute deck loads to the various top chords 17. However, when such additional members or sills 28 are employed, in order to obtain the maximum benefit of this invention, the rule previously mentioned should be followed and these members should be made to engage the top chords 17 of the longitudinal trusses at positions spaced from positions of the engagement with those chords of the struts 19 and 20. By this means, loads transmitted from the members 28 to the top chords 17 will place these top chords in beam loading.

In FIGS. 7 to 12, inclusive, the locking mechanism of this invention is illustrated more in detail. It will be seen that within the channels 11 there are slidably mounted for vertical movement locking bars made up of elongated rods 29 of which two are illustrated, and which are joined together at their lower ends by being welded or otherwise suitably secured at the opposite edges of a locking member 30 which is slotted at 31 to engage about the reduced portion or neck of one of the pins 16 and lock such pin in place with the corresponding socket 13.

Likewise, at their upper ends, the rods 29 are joined together by being welded or otherwise suitably secured to opposite edges of an upper locking member 32 having an open-ended slot 33 therein adapted to engage about an upper pin embracing the neck portion thereof to lock such pin within one of the upper sockets 13 which is associated with the locking member 32. The upper portion of the locking member 32 is provided with a driving head 34 adapted to be struck with a hammer or the like for the purpose of driving the locking bar downwardly into locking position. This upper head portion 34 is adapted when the bar is in its lowermost position as illustrated in FIGS. 7, 10 and 11 to occupy a position with its upper surface substantially flush with the upper surface of the deck 24. It has an overhanging part 35 providing a lip beneath which may be engaged a bar or the like for the purpose of starting the locking bar in its upward or unlocking movement.

In accordance with this invention, the rods 29 are held securely in frictional engagement between bearing bars 36, 37 and 38 which are welded in and extend between the opposite sides of the channel 11. These bearing bars 36, 37 and 38 are so positioned that if a straight line be drawn tangent to the bars 36 and 37 on the sides thereof closest to the bearing bar 38, the distance between such straight line and the closest point of the bearing bar 38 will be less than the diameter of the rods 29. It follows that when these rods 29 are forced between these bearing bars 36, 37 and 38, the bars 36, 37 and 38 will serve as guideways for the locking means and the rods 29 will be forced to bow slightly in order to pass between these bearing rods. Since the rods 29 are made of spring material in accordance with this invention, this bowing will cause them to be gripped tightly by frictional engagement between the bearing bars 36, 37 and 38. Furthermore, if through mishandling an outward pull is taken on one or more of the bars 29, the bar 38 will tend to hold it against being pulled outwardly and provided with a permanent set destroying its frictional holding.

The bearing bars 36 and 37 are so positioned that they will constantly urge the locking members 30 and 32, respectively, toward engagement with the corresponding socket members 12. Thus, when the locking members 30 and 32 are in engagement with pins 16 as illustrated in FIGS. 10 and 11, the spring tension on the rods 29 will tend to hold the pins 16 away from the body of the float on which the sockets 12 are carried. However, the pins are so proportioned that when in this position, as illustrated in FIG. 10, there will be a slight standoff 39 between the face of the float on which the pins 16 are carried and the adjacent surfaces of the blocks 12 in which sockets 13 are formed. In wave motion and loading, floats joined in this fashion will be constantly moving with respect to one another with the result that the pins will be forced inwardly until the surface of the float on which the pins are carried will engage the adjacent face of the socket block 12 as illustrated at the upper portion of FIG. 11, thereby forcing the locking member 30 or 32 as the case may be away from contact with its socket block 12 and destroying any tendency of these parts to be joined together by corrosion or the like. For the same reason, no corrosion or the like can tend to freeze the pins within the sockets 13 nor to freeze the surface of the float carrying the pins 16 against the socket blocks 12. Furthermore, the necks of the pins 16 are made just slightly wider than the thickness of the locking members 30 and 32, so that when the pin works within a locking member it will constantly free itself from any corrosion joining it to the locking member.

Downward movement of the locking bars is, of course, limited by engagement of these bars with the necks of pins and by the engagement of the head 34 with small blocks 40 welded or otherwise suitably secured to opposite sides of the channel 11 just beneath the head 34. These blocks are so positioned as to stop the head 34 with its upper surface substantially flush with the deck 24.

On upward movement, the locking bars are limited in their travel by engagement of a stop member in the form of a small channel 41 carried on the locking bars with the upper bearing bar 36.

On reference to FIGS. 10 and 11, it will be seen that each of the blocks 40 has in its forward end a V-shaped notch 42 and that when the locking bar is in its lowermost position, the upper locking member 32 has a V-shaped projection 43 lying directly opposite the V-shaped recess 42 in the block 40. When the upper surfaces of the two floats are not being urged toward each other, the upper bearing member 32 will be held against the socket block 12 in which position the projection 43 will not engage within the notch or opening 42. In this position the locking bar will be free to move up and down.

On the other hand, when the parts are moved to the position illustrated in the upper portion of FIG. 11, as will be the case when a load is placed upon the decks 24 of the adjacent floats, the projection 43 will be moved into full engagement with the V-shaped socket or depression 42, in which position the locking bar will be prevented from moving upwardly. There is no substantial tendency for the bar to be moved upwardly except when it is flexed back and forth from the position shown in FIG. 10 to that shown in FIG. 11. Each time it is flexed from the position shown in FIG. 10 to that shown in FIG. 11, any small amount by which it may have departed from its fully engaged position will be corrected by engagement of the cam surfaces on the projections 43 with the cam surfaces in the V-shaped depressions 42.

It will be noted at this point that the heads on the pins 16 are formed by means of reduced or neck-like portions between the heads and the points where these pins are secured to their respective floats, and that in the form of the invention illustrated these necks on these pins do not completely encircle the pins but are formed by a groove extending across the upper surface of the pin and down the two sides but discontinuous across the bottom thereof. Thus, the neck portion is made stronger by being made of greater cross section than if the groove which forms the neck portion completely encircled the pin. This strengthening of the pin substantially reduces the tendency to breakage thereof without in anywise effecting the efficiency of the pin for its intended purpose.

On reference to FIGS. 7 and 9, it will be seen that the lower portions of the open-ended slots in the locking members 30 and 32 are flared apart as shown at 44. This enables these locking members to engage a pin within a socket within which the locking members are associated even though the pin may be eccentrically located in the socket due to the tolerance between the diameter of the pin and the diameter of the socket. Then when the locking member is forced home by hammering from above or the like, the flared portions 44 of these locking members will force the pins into centered position within the narrower portions of the slots 31 and 33, respectively.

If, per chance, the pin with which one of the locking members 30 is about to be engaged to lock the pin in place, has been forced into the socket until the wall 26 of the float on which it is mounted is in contact with the adjacent socket block 12, then upon downward movement of the locking member it would engage the shoulder inboard from the groove in the pin and be prevented from downward movement into locking position. In order to prevent this from occurring, each of the locking members is beveled on its surface adjacent the socket block with a short bevel 45 so that it will not seat firmly upon the larger portion of the pin behind the groove but will enter the groove and tend to wedge itself into the groove as the locking member is moved downwardly. The depth of this bevel 45 need be only sufficient to enable it to engage the groove of a pin which has been pushed in sufficiently to take up the standoff space 39. Hence, it may be quite shallow as shown.

On the other hand, if one of the pins 16 be not pushed in quite far enough at the time the locking bar is forced downwardly, the locking member would engage the head of the pin outboard from the groove. In order to prevent this from occurring, a substantially larger bevel is placed on the opposite surface of the locking member from the bevel 45 as shown at 46. When this bevel engages behind the head of the pin 16 and the locking member is forced downwardly, it will draw the pin 16 further into the socket until the locking member can be forced home.

As best seen in FIG. 9, these bevels 45 and 46 are not flat surfaces where the locking members are to be used with round head pins as illustrated. Instead, they are surfaces which are generated by a round end mill of the same diameter as the large portion of the pin 16. Thus, when the locking member 30 is engaged only a slight amount with the head of the pin 16, the shoulder provided between this head and groove will engage all along the corner of the shoulder with the surface of the bevel 46 or with the surface of the bevel 45 as the case may be. This configuration provides a greater surface contact area between the locking members and the sides of the grooves in the pins during the wedging action necessary to bring the pins into alignment with the locking members, which substantially reduces wear and tear on the pins and locking members as well as making it much easier to force the locking members into place and move the pins into proper position.

Turning now to FIG. 13, there is shown a combination of floats constructed in accordance with this invention being used as a bridge across a stream. It will be understood that with proper anchorage such a combination could be used without the second land approach as a pier.

As illustrated, the bridge consists of a number of floats constructed in accordance with this invention making up the central or water supported section of the bridge and joined together with means such as that described in connection with FIGS. 1 to 12 inclusive. For the purpose of describing this figure, the floats so assembled and making up the completely water supported portion of the bridge are designated as 47. The portions of the bridge which actually extend to and connect with the bank are in the form of ramps 48. These ramps 48 are secured to the end floats 49 by connecting means which are also of substantially the same nature of those by which the floats 47 are joined to each other.

The connections by which the floats 47 are joined to each other and by which the ramp 48 and the float 49 are joined to each other provide some flexibility between floats as will be well understood from the foregoing description. However, in a situation such as that illustrated in FIG. 13 in which one portion of the structure rests on solid ground and another portion of floats, it is necessary if excessive stresses are to be avoided in the connection between the parts that a greater amount of flexibility be permitted than provided by the locking means heretofore described. For this purpose, there is provided a flexible connection in the form of a hinge joint which is shown in FIG. 13 for joining together the float 49 at each end of the bridge with the next adjacent float 47. This hinge connection is illustrated more in detail in FIGS. 14 and 15 and provides for a hinging movement about a horizontal axis between the so joined floats 47 and 49.

With this arrangement when the water on which the floats 47 are supported drops or rises, or when a load is moved onto or off of the floats 47, the land end of the ramps 48 will, of course, remain at the same level while the floats 47 lower or raise as the case may be. The float 49 will, at its edge closest to the floats 47, lower or raise with those floats but its deck will remain in substantial alignment with the deck surfaces of the ramps 48 and the hinge connections will permit a hinging action between the units formed of the ramps 48 and floats 49 on the one hand and the floats 47 on the other hand. Thus, it will be seen that there will be no excessive stresses placed upon the connections between the floats.

Of course, it is true that various means might be provided for hingedly joining together such floats in the desired manner but from a practical standpoint it is highly desirable that such hinging connections be capable of utilizing the standard locking mechanism customarily used for joining floats directly to each other. It is also highly desirable that means be provided for at least partially filling in the gap in the deck surface between floats joined by such a hinging connection.

With reference to the hinging connection illustrated in FIGS. 14 and 15, these are designated both to utilize the standard locking mechanism used for locking floats together and also to provide a substantial bridging of the gap in the deck surfaces between floats so joined.

In the form illustrated, the hinging connection actually consists of a dual unit each of which has two hinge members 50 and 51 pivotally joined to each other adjacent their upper ends by means of a horizontal pivot pin 52 passing through ears 53 and 54 formed on the hinge members 50 and 51. These hinge members may be fabricated in any form found desirable but are advantageously made with channel shaped cross section as illustrated. Mounted on one of these hinge members 50 is a plurality of locking pins 55 and 56 which are preferably in substantially vertical alignment and spaced apart by approximately the same distance as the locking pins 16 provided on the float sections. These pins 55 and 56 are likewise preferably of the same size and construction as the locking pins 16, having enlarged heads separated from that portion of the pin which is joined to the hinge member 50 by means of a groove 57 or 58 as the case may be, and the pins themselves being welded or otherwise suitably secured to the hinge member 50. Thus, it will be seen that the hinge member 50 may be secured to the socket side of any float at the position of any vertically aligned group of sockets on the float. Furthermore, the pins 55 and 56 are so positioned on this hinge member that when so secured the upper surface of the hinge member 50 will be substantially flush with the deck of the float to which it is secured.

The other hinged member 51 is provided with socket blocks 60 with sockets 61 therein which are also vertically aligned and positioned with respect to socket blocks 62 and sockets 63 to receive the pins provided on the float sections for securing them together in accordance with this invention. Likewise, locking bars 64 frictionally engage between bearing bars 65, 66 and 67 are provided which are substantially identical in construction and operation to the locking bars and locking members and their mounting heretofore described in connection with the float locking structure. Obviously, these are likewise designed so that the hinge member 51 may be secured to the pin carrying side of any float constructed in accordance with this invention and appropriately dimensioned, engaging any vertically aligned group of pins on such float and being locked thereto in the same fashion that two floats may be locked together.

It may be that in some instances a single pair of hinge members 50 and 51 may be employed to join together two floats or other structures carrying the locking mechanism constructed in accordance with this invention. However, in most instances it will be found desirable to employ two such pairs of members which are hinged together and to join one float to one of the hinge members of each pair at spaced positions along the side of the float, while another float is joined to the other of the hinge members of each pair at spaced positions along the side of the other float. This provides a hinge connection between floats at spaced points along the length or breadth thereof, as the case may be, with the pivots of the two hinge connections in axial alignment with one another so that there will be a free hinging operation between the floats and yet any tendency of the floats to twist or warp with respect to each other will be strongly resisted by the spaced apart hinge connections.

It has been found highly desirable and very convenient to join together two such hinge connections to provide a hinging unit such as illustrated in FIG. 14. In this figure it will be seen that the lower ends of the hinge members 51 of the two hinging connections are joined together by a channel or bar 68 extending horizontally between them and secured to each of them in any suitable manner as by welding or the like, while the upper ends of these same hinge members are joined together by additional channel bars or the like 69 and 70 joined to the upper ends of the hinge members 51 in the same fashion. The upper ends of the hinge members 51 being so positioned with respect to the sockets 61 that their upper surfaces will be substantially flush with the decks of the adjacent floats on which they may be mounted, it is convenient to mount treads or deck plates 72 on top of the channel members 69 and 70 which will in effect provide a continuation of the deck surface of the float to which the hinge members 51 may be secured.

On the other hand, the hinge members 50 may be joined together adjacent their lower ends by means of a channel 73 and at their upper ends by means of channels 74 and 75 which may be similar in all respects to the channels 68, 69 and 70, respectively. Likewise, tread surfaces 76 may be secured to the upper surfaces of the channels 74 and 75 providing a deck surface continuation of the deck surface of the float to which the hinging member 50 may be secured.

It will be understood that the spacing bars 68, 69, 70, 73, 74 and 75 are of such length that they will space apart the hinging members 50 and 51 of the two hinges exactly the amount required for these hinging members to engage with selected laterally spaced vertical groups of pins on one float and sockets on the other float. No limitation is to be implied from the fact that the hinge units illustrated are dual hinge units as it will be appreciated that as many hinges as desired may be incorporated into a single unit by providing appropriate connecting bars therebetween. It is also apparent that as many dual units or units of other multiples may be employed between a single pair of floats as may be desired.

From the foregoing it will be seen that the hinge connection illustrated makes it possible to provide a bridge, barge, support platform, or other unit with highly flexible joints in circumstances where that may be desirable, and to use the same means for interconnecting the floats in providing such barge construction as is used when the floats are connected directly to each other without an intermediate hinge connection.

Turning now to FIGS. 16 and 17, there is illustrated what may be termed a barge construction comprising a pair of floats 78 and 79 which are spaced apart so as to provide an open waterway therebetween but which are integrally joined together into a single unit by means of a pair of upstanding yokes 80 and 81, these yokes having their closed ends disposed uppermost and their downwardly extending legs extending downwardly along the adjacent sides of the floats 78 and 79 and secured thereto. These yokes being made substantially rigid provide a means for joining together the floats 78 and 79 in a unitary structure which will operate as a single unit but which has an open waterway between the floats for the purpose of handling a load such as a pipeline 82. For use in handling such a load between the floats there is provided a hoisting mechanism 83 which may be mounted on means connecting the two yokes 80 and 81 into a single unit for ease of handling. This hoisting mechanism 83, being mounted between the two yokes and between the adjacent sides of the two floats, may be employed to raise or lower or to support in the space between the two floats any load which may be desired.

It will be understood that while the two yokes could be used without being joined together or more than two yokes could be employed if desired between a single pair of floats, joining the yokes together in multiple units makes them easier to handle and position and at the same time provides a support for mounting a hoisting mechanism 83 as illustrated.

Where a very long load such as the pipeline 82 is to be handled, a plurality of barges constructed in this manner by joining pairs of floats with yoke units in the manner illustrated may be employed at intervals along the load. If desired for purposes of continuity, the floats of such successive barges may be likewise joined together by spacers 84 secured at their respective ends to the adjacent ends of the floats of adjacent barges. These spacers 84 and the means of securing them to the floats may be of any form desired.

For a more specific example of a preferred form of yoke unit construction, reference is had to FIG. 17 in which two yokes 80 and 81 are disposed in spaced apart relationship and secured together by means of interconnecting beams 85 and 86 providing a single unitary rigid construction. The hoisting mechanism 83 may be mounted upon the beams 85 or in any other suitable fashion. The legs 87 and 88 of the two yokes are adapted to extend down along the adjacent sides of the floats which are to be joined by these yokes. Adjacent the lower ends of such legs on the outwardly facing surfaces thereof are provided locking pins 89 and 90 in substantially vertical alignment. The vertical spacing of such locking pins 89 and 90 and the horizontal spacing between the locking pins 89 and 90 on the respective yokes is preferably selected as such as will enable these locking pins to fit into selected horizontally spaced, vertically aligned groups of sockets in floats constructed in accordance with this invention which are to be joined together by this yoke unit.

Again in the instance of these yoke units, advantage is taken of universal use of the locking mechanism provided in accordance with this invention so that floats equipped with such mechanism may be secured together by these yoke units in spaced apart relationship with a free waterway therebetween just as such floats may be secured directly to each other by such locking mechanism or may be secured to each other by the interposition of a hinge unit as illustrated in FIGS. 14 and 15, again employing the same locking mechanism.

At times it is necessary to secure along the sides of floats or barges constructed in accordance with this invention brackets for various purposes. One such bracket which is in the form of what is known as a spud well is illustrated in FIG. 18 secured to the side of a float 91. The float 91 is assumed to be one constructed in accordance with this invention insofar as the locking mechanism is concerned. The bracket 92 has, in this instance, a sleeve 93 adapted to receive a spud 94, the sleeve and spud being arranged on a substantially vertical axis so the spud may be lowered through the sleeve into engagement with a subterranean surface thereby anchoring the float 91 at that point.

It is highly desirable that such brackets be firmly and strongly affixed to the floats so that with the exception of a small amount of flexibility such as is provided by the locking mechanism of this invention they will become integral with the float. In this instance, the bracket is provided with pins 95 adapted to engage within the sockets forming a part of the locking mechanism of this invention. Preferably, two laterally spaced, vertically aligned groups of such pins are provided on a single bracket so that these pins may be spaced apart identically with corresponding sockets on a float constructed in accordance with this invention. Thereby the bracket may be brought into engagement with and locked to the side of a float at laterally spaced, vertically aligned groups of sockets on the float and will provide a very firm means of securing the bracket to the float.

When such a bracket construction is employed, a spud therein may be raised or lowered by means of a cable 96 or the like, secured near the lower end of the spud and passed out through a suitable opening in the bracket 92 and onto a drum 97 of a hoisting mechanism mounted on the deck of the float 91.

From the foregoing it will be seen that there is provided by this invention a barge construction incorporating standard interengaging interlocking parts built into floats that can be joined together to make up a barge construction. The float construction is such that it may flex to a very substantial degree without taking a permanent set under load conditions. This not only makes possible a lighter and cheaper float construction but also makes possible the use of the standard positioning, spacing, etc., of a locking mechanism system for securing together in interchangeable fashion the floats so constructed. By this invention there is also provided a locking mechanism of universal application in that standard design and construction thereof may be employed with standard spacing on standard float constructions making it possible to join any floats so constructed to any other floats so constructed in a fashion which is permanent insofar as utility is concerned but in a fashion which makes the floats readily detachable from each other. It makes it possible also to secure the floats together and to secure other members to the floats in various fashions, all employing the same standard locking mechanism and spacing.

From the foregoing it will be seen that this invention is one well adapted to attain all of the ends and objects herein above set forth, together with other advantages which are obvious and which are inherent to the apparatus and structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A float comprising a structural framework and a covering of sheet material enclosing said framework, said framework including intersecting longitudinal and transverse trusses disposed in vertical planes and secured together at their intersections, and trusses being flexible in a vertical direction, each of said trusses having longitudinal upper and lower chord members and struts interconnecting the upper and lower chord members of each truss, said longitudinal and transverse trusses having their longitudinal upper and lower chord members crossing and secured to each other at points spaced from all the connections to said upper and lower chord members of the transverse struts of said trusses and the upper chord members of one of said sets of trusses forming sills across the other of said sets of trusses, whereby said trusses will load each other's upper and lower chord members with beam loadings.

2. A barge comprising a plurality of float sections, mating pins and sockets carried by adjacent float sections to releasably lock the float sections together, said pins loosely fitting in the sockets and having enlarged heads extendings through the sockets, and locking means with open-ended slots therein of a size to receive the pins inboard of the heads and smaller than the heads of the pins to lock the pins in the sockets, said locking means being mounted for movement in guideways associated with the sockets, respectively, and being movable from a first position with the locking means clear of the sockets to a second position with the locking means between the heads of the pins and the sockets to lock the float sections together, the enlarged heads on said pins being formed by a groove on each pin extending across the top and down the sides thereof and being discontinuous across the bottom of the pin.

3. A float having pins along one side thereof and sockets along the opposite side thereof, said pins being of a size and shape to mate with and loosely fit within and having enlarged heads adapted to extend through sockets identical with said first-mentioned sockets, and locking means with open-ended slots therein of a size to receive pins identical with said first-mentioned pins inboard of the heads of such pins and smaller than the heads of such pins to lock said pins in the sockets, said locking means being mounted in a guideway associated with said first-mentioned sockets and movable from a first position with the locking means clear of the sockets to a second position with the locking means between the heads of the pins and the sockets, said pins and sockets being correspondingly positioned and spaced on the float whereby the pins on said float are engageable with the sockets on another identical float and the sockets on said float will receive the pins on another identical float, the enlarged heads on said pins being formed by a groove on each pin extending across the top and down the sides thereof and being discontinuous across the bottom of each pin.

4. A barge comprising a plurality of float sections, mating pins and sockets carried by adjacent float sections to releasably lock the float sections together, said pins loosely fitting in the sockets and having enlarged heads extending through the sockets, locking means with open-ended slots therein of a size to receive the pins inboard of the heads and smaller than the heads of the pins to lock the pins in the sockets, said locking means being mounted in a guideway associated with said first-mentioned sockets and movable from a first position with the locking means clear of the sockets to a second position with the locking means between the heads of the pins and the sockets to lock the float sections together, the enlarged heads on said pins being formed by a groove on each pin extending across the top and down the sides thereof and said locking means being beveled on opposite faces on opposite sides of the open ends of said slots to facilitate the engagement thereof with said grooves when said pins are slightly too far in or not quite far enough into said sockets to register fully with said locking means, said beveled surfaces being curved surfaces whose cross-sectional shape in any plane which intersects said surfaces and is perpendicular to the center line of the socket, is substantially the same as that portion of the edge of the groove in the pin with which the beveled surface may engage in moving to locked position on such pin.

5. A float having pins along one side thereof and sockets along the opposite side thereof, said pins being of a size and shape to mate with and loosely fit within and having enlarged heads adapted to extend through sockets identical with said first-mentioned sockets, and locking means with open-ended slots therein of a size to receive pins identical with said first-mentioned pins inboard of the heads of such pins and smaller than the heads of such pins to lock such pins in the sockets, said locking means being mounted in guideways associated with said first-mentioned sockets and being movable from a first position with the locking means clear of the sockets to a second position with the locking means between the heads of the pins and sockets, said pins and sockets being correspondingly positioned and spaced on the float whereby the pins on said float are engageable with the sockets on another identical float and the sockets on said float will receive the pins on another identical float, and means resiliently urging said locking means outwardly from said float and yieldable to permit locking means to move inwardly toward the float when a pin engaged by said locking means is moved inwardly toward said float, and cam means on said float and locking means respectively engageable upon such movement of the locking means inwardly toward the float to correct a small deviation of said locking means from fully engaged position.

6. A float constructed in accordance with claim 12 in which said pins and sockets are arranged in vertical groups, the locking means for said sockets in one vertically arranged group being mounted on common locking bars for actuation together and said locking means having limited movement toward and away from said float to permit two such floats secured together to move with respect to each other, and the cam means being on said float and the upper locking means of a vertical group, and engageable upon movement of the locking means inwardly toward the float to correct a small deviation of the locking means in a complete vertical group from fully engaged position.

7. A float having pins along one side thereof, and sockets along the opposite side thereof, said pins being of a size and shape to mate with and loosely fit within and having enlarged heads adapted to extend through sockets identical with said first-mentioned sockets, and locking means with open-ended slots therein of a size to receive pins identical with said first-mentioned pins inboard of the heads of such pins and smaller than the heads of such pins to lock such pins in the sockets, said pins and sockets on the float being arranged in vertical groups, bars mounted in guideways associated with said first-mentioned sockets, and said locking means for a single vertical group being mounted on the same ones of said bars, and said locking means and bars on which they are mounted being movable from the first position with the locking means clear of the sockets to a second position with the locking means between the heads of the pins and the sockets, said pins and sockets being correspondingly positioned and spaced on the float whereby the pins on said float are engageable with sockets on another identical float and the sockets on said float will receive the pins on another identical float, the said locking bars being of spring material, and each of said guideways being provided by a pair of bearing members vertically spaced from each other and from said sockets, respectively, and fixed on said float, said bearing members engaging the bars between the bars and said float to hold the locking members outwardly from said float, and a third bearing member on said float spaced between said pair of bearing members and disposed on the opposite side of said bars, said last bearing members being disposed so close to a straight line between said first two bearing members as to force a deflection in said bars between said first two bearing members and cause a frictional gripping of said bars between said bearing members.

8. A flexible barge comprising a plurality of float sections, vertically and horizontally spaced mating pins and sockets carried by adjacent float sections in substantially vertically arranged groups to releasably lock the float sections together, said pins adapted to loosely fit in the sockets and having enlarged heads extending through the sockets, and locking bars mounted for vertical movement in guideways associated with each vertical group of sockets, said bars having vertically spaced locking means with downwardly opening slots therein of a size to receive the pins inboard of the heads and smaller than the heads of the pins to lock the pins in the sockets, said bars movable vertically from a position with the locking means elevated to clear the sockets and top of the bars above the decks of the floats to a position with the locking means adapted to lock the pins in the sockets and the top of the bars substantially flush with the deck of the float, whereby all pins of a vertically arranged group can be engaged by driving a locking bar downwardly from the deck of the float, and a pair of hinge members pivoted together on a horizontal axis, one hinge member having vertically extending parts overlying a vertically arranged group of pins on one float and the other hinge member having vertically extending parts overlying a vertically arranged group of sockets on the other float, said one hinge member having a vertically arranged group of sockets and locking members mating with, receiving and locking said vertically arranged group of pins on said one float and said other member having a vertically arranged group of pins mating with, received in and locked in said vertically arranged group of sockets on said other float.

9. A barge comprising a plurality of float sections, vertically and horizontailly spaced mating pins and sockets carried by adjacent float sections in substantially vertically arranged groups to releasably lock the float sections together, said pins adapted to loosely fit in the sockets and having enlarged heads extending through the sockets, and locking bars mounted for vertical movement in guideways associated with each vertical group of sockets, said bars having vertically spaced locking means with downwardly opening slots therein of a size to receive the pins inboard of the heads and smaller than the heads of the pins to lock the pins in said sockets, said bars movable vertically from a position with the locking means elevated to clear the sockets and the top of the bars above the decks of the floats to a position with the locking means adapted to lock the pins in the sockets and the top of the bars substantially flush with the deck of the floats, whereby all pins of a vertically arranged group can be engaged by driving a locking bar downwardly from the deck of the float, and two pairs of hinge members, both pairs of hinge members being pivoted together on the same horizontal axis and having one member of each pair with vertically extending parts overlying a vertically arranged group of pins on one float and the other member of each pair having vertically extending parts overlying a vertically arranged group of sockets on the other float, with said one member of each pair having a vertically arranged group of sockets and locking members mating with, receiving and locking said vertically arranged groups of pins on said one float and said other member of each pair having a vertically arranged group of pins mating with, received in and locked in said vertically arranged group of sockets on the other float, whereby said two floats are provided with hinge connections at each of the locations of two vertical groups of pins and sockets on the respective floats.

10. A barge comprising a plurality of float sections, vertically and horizontally spaced mating pins and sockets carried by adjacent float sections in substantially vertically arranged groups to releasably lock the float sections together, said pins adapted to loosely fit in the sockets and having enlarged heads extending through the sockets, and locking bars mounted for vertical movement in guideways associated with each vertical group of sockets, said bars having vertically spaced locking means with downwardly opening slots therein of a size to receive the pins inboard of the heads and smaller than the heads of the pins to lock the pins in said sockets, said bars movable vertically from a position with the locking means elevated to clear the sockets and the top of the bars above the decks of the floats to a position with the locking means adapted to lock the pins in the sockets and the top of the bars substantially flush with the deck of the floats, whereby all pins of a vertically arranged group can be engaged by driving a locking bar downwardly from the deck of the float, and two pairs of hinge members, both pairs of hinge members being pivoted together on the same horizontal axis and having one member of such pair with vertically extending parts overlying a vertically arranged group of pins on one float and the other member of each pair having vertically extending parts overlying a vertically arranged group of sockets on the other float, with said one member of each pair having a vertically arranged group of sockets and locking members mating with, receiving and locking said vertically arranged groups of pins on said one float and said other member of each pair having a vertically arranged group of pins mating with, received in and locked in said vertically arranged group of sockets on the other float, whereby said two floats are provided with hinge connections at each of the locations of two vertical groups of pins and sockets on the respective floats, and means extending between and connecting the hinge members secured to one float and providing a tread surface substantially flush with the deck of said float, and other means extending between and securing together the hinge members connected to the other float and providing a tread surface substantially flush with the deck of said other float.

11. A hinge comprising two hinge members pivotally secured together and each extending a substantial distance in a direction transverse to the axis of said pivotal connection, one of said hinge members having pins along one side thereof extending in a direction away from the other member, and the other of said hinge members having sockets positioned correspondingly to said pins to receive pins identical to said first-mentioned pins and correspondingly positioned with respect to each other, said pins being of a size and shape to mate with and loosely fit within and having enlarged heads adapted to extend through sockets identical with said first-mentioned sockets, locking means with open-ended slots therein of a size to receive pins identical with said first-mentioned pins inboard of the heads of such pins and smaller than the heads of such pins to lock such pins in the sockets, said locking means being mounted in guideways associated with said first-mentioned sockets and movable from a first position with the locking means clear of the sockets to a second position with the locking means between the heads of the pins and the sockets, said pins and sockets being correspondingly positioned and spaced on their respective members.

12. A hinge construction comprising a pair of hinge members pivotally connected to each other and each extending in a direction transverse to the axis of said pivot for a substantial distance, one of said members having pins along one side thereof extending in a direction away from the other member and the other of said members having sockets along its surface facing away from the first member, said pins being of a size and shape to mate with and loosely fit within and having enlarged heads adapted to extend through sockets identical with said first-mentioned sockets, and locking means with open-ended slots therein of a size to receive pins identical with said first-mentioned pins inboard of the heads of such pins and smaller than the heads of such pins to lock such pins in their sockets, said locking means being mounted in guideways associated with said first-mentioned sockets and movable from a first position with the locking means clear of the sockets to a second position with the locking means between the heads of the pins and the sockets, said pins and sockets being arranged in a plurality of groups, the pins and sockets in a given group being aligned with each other in a direction transverse to the axis of said pivot and said groups being spaced laterally from each other, said pins and sockets being correspondingly positioned and spaced on their respective members whereby the pins on said first member are engageable with sockets identically positioned and spaced with those on said second member and the sockets on said second member will receive pins identically positioned and spaced with those on said first member.

13. A hinge construction comprising a pair of hinge members pivotally connected to each other and each extending in a direction transverse to the axis of said pivot for a substantial distance, one of said members having pins along one side thereof extending in a direction away from the other member and the other of said members having sockets along its surface facing away from the first member, said pins being of a size and shape to mate with and loosely fit within and having enlarged heads adapted to extend through sockets identical with said first-mentioned sockets, and locking means with open-ended slots therein of a size to receive pins identical with said first-mentioned pins inboard of the heads of such pins and smaller than the heads of such pins to lock such pins in their sockets, said locking means being mounted in guideways associated with said first-mentioned sockets and movable from a first position with the locking means clear of the sockets to a second position with the locking means between the heads of the pins and the sockets, said pins and sockets being arranged in a plurality of groups, the pins and sockets in a given group being aligned with each other in a direction transverse to the axis of said pivot and said groups being spaced laterally from each other, said pins and sockets being correspondingly positioned and spaced on their respective members whereby the pins on said first member are engageable with sockets identically positioned and spaced with those on said second member and the sockets on said second member will receive pins identically positioned and spaced with those on said first member, and tread means on each of said members providing tread surfaces which in one pivotal position of said members with respect to each other will occupy substantially the same plane with each other.

14. A barge comprising a plurality of float sections spaced laterally from each other to provide an open waterway therebetween, and a pair of structural yokes disposed in spaced upright planes transversely of the space between said float sections with their closed ends uppermost and disposed above said float sections and their legs disposed along the sides of said float sections, respectively, and means securing said legs non-pivotally to said float sections at vertically spaced positions to bridge the space between said float sections and join them together to a unitary barge structure with an open waterway therebetween.

15. A barge in accordance with claim 14 in combination with means in addition to said float sections bridging the space between said yokes and joining them together into a unitary structure.

16. A barge in accordance with claim 14 in combination with means in addition to said float sections bridging the space between said yokes and joining them together into a unitary structure, and a hoisting mechanism mounted on said bridging means for hoisting, lowering and suspending a load between said float sections.

17. A barge in accordance with claim 14 in which the means securing the yokes to said float sections are vertically spaced, readily releasable latching means on each leg of each yoke and on the float section wall at the position at which such leg is to be secured thereto.

18. A barge constructed in accordance with claim 14 in which the yokes are secured to said float sections by vertically spaced mounting pins and sockets carried by each of the legs of each of said yokes and in the adjacent wall of the float section to which it is secured, said pins loosely fitting in the sockets and having enlarged heads extending through the sockets, and locking bars mounted for vertical movement in guideways associated with each vertical group of sockets, said bars having vertically spaced locking means with downwardly opening slots therein of a size to receive the pins inboard of the heads and smaller than the heads of the pins to lock the pins in the sockets, said bars movable vertically from a position with the locking means elevated to clear the sockets to a position with the locking means locking the pins in the sockets.

19. A float coupling and spacing means comprising a pair of yokes rigidly secured together in parallel spaced relation, the legs of said yokes each having a plurality of latch elements spaced along the outer surface of the leg adjacent the end thereof to secure said legs to the sides of adjacent parallel float sections and couple said float sections together in spaced unitary relationship with an open waterway therebetween.

20. A float coupling and spacing means in accordance with claim 19 in which said latch elements are pins projecting from the surface of the leg and having enlarged heads thereon adapted to be received and latched in sockets in outside float walls.

21. A float coupling and spacing means in accordance with claim 19 in combination with a hoisting mechanism mounted between said yokes on the means securing them together for hoisting, lowering and suspending a load between float sections joined by said yokes.

22. In combination, a float, a bracket, and means releasably securing them together comprising vertically and horizontally spaced mounting pins and sockets carried by said float and bracket, respectively, in substantially vertically arranged groups, said pins loosely fitting in the sockets and having enlarged heads extending through the sockets, and locking bars mounted for vertical movement in guideways associated with each vertical group, said bars having vertically spaced locking means with downwardly opening slots therein of a size to receive the pins inboard of the heads and smaller than the heads of the pins to lock the pins in the sockets, said bars movable vertically from a position with the locking means elevated to clear the sockets to a position with the locking means locking the pins in the sockets.

23. A float comprising a structural framework and a covering of sheet material enclosing said framework, said framework including intersecting longitudinal and transverse trusses disposed in vertical planes and secured together at their intersections, said trusses being flexible in a vertical direction, each of said trusses having longitudinal upper and lower chord members and strut members interconnecting the upper and lower chord members of each truss, certain of said chord members of transverse trusses being in lateral load-bearing engagement with certain of said chord members of longitudinal trusses at locations spaced from the connection of all struts to both of the chord members in engagement at such locations.

References Cited in the file of this patent

UNITED STATES PATENTS

| | | |
|---|---|---|
| 933,794 | Sprung | Sept. 14, 1909 |
| 2,085,156 | Hill | June 29, 1937 |
| 2,352,296 | Szego | June 27, 1944 |
| 2,412,578 | Harris | Dec. 17, 1946 |
| 2,481,821 | Byrne et al. | Sept. 13, 1949 |
| 2,518,091 | Stopkevyc | Aug. 8, 1950 |
| 2,605,733 | Smith | Aug. 5, 1952 |
| 2,698,591 | Scaife | Jan. 4, 1955 |
| 2,711,148 | Schmidt | June 21, 1955 |
| 2,773,468 | Besse | Dec. 11, 1956 |
| 2,876,726 | Robishaw | Mar. 10, 1959 |
| 2,879,735 | Pointer | Mar. 31, 1959 |